United States Patent [19]

Rosaz

[11] 4,353,156

[45] Oct. 12, 1982

[54] MACHINE FOR POSITIONING VALVES ON RIMS FOR TUBELESS TIRES

[75] Inventor: Guy F. Rosaz, Pontarlier, France

[73] Assignee: Scovill Inc., Waterbury, Conn.

[21] Appl. No.: 184,385

[22] Filed: Sep. 5, 1980

[51] Int. Cl.³ .............................................. B23P 13/00
[52] U.S. Cl. ................................................... 29/221.5
[58] Field of Search ........................... 29/221.5, 213 R

[56] References Cited

U.S. PATENT DOCUMENTS 3,827,127  8/1974  Tanihata et al. .................... 29/221.5

FOREIGN PATENT DOCUMENTS 52-266668  2/1977  Japan .................................. 29/221.5
949078  2/1964  United Kingdom ............... 29/221.5

Primary Examiner—James L. Jones, Jr.

Attorney, Agent, or Firm—Robert E. Burns; Emmanuel J. Lobato; Bruce L. Adams

[57] ABSTRACT

A machine for inserting tire valves on wheel rims designed for receiving tubeless tires comprises pneumatic, electrical and/or electronic apparatus for logically programming a rim conveyor, apparatus for detaching a single rim and successively positioning same in waiting, operative and discharge positions, apparatus for exerting a pressure against the detached rim in the operative position for engagement with a rotary drive, apparatus for rotating the rim, apparatus for detecting the valve hole in relation to an axis ZZ of the emitting and receiving elements of a detection cell, apparatus for positioning the valve hole on an axis YY common to a centering spindle and to a cylinder carrying the valve to be inserted into the valve hole, apparatus for selecting a valve for each rim, apparatus for positioning the valve into the rim hole, and apparatus for holding the rim during the valve positioning operation.

14 Claims, 7 Drawing Figures

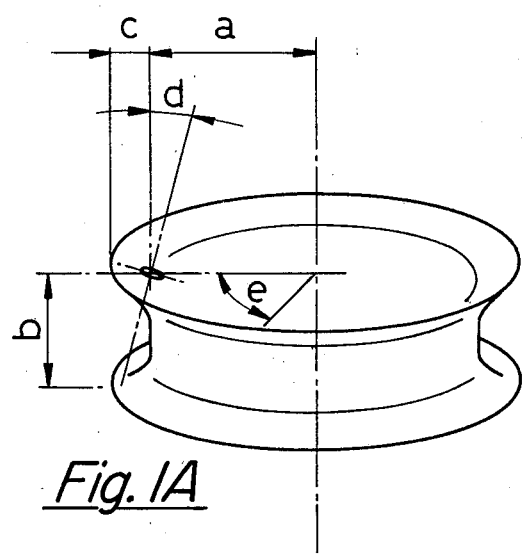
Fig. IA
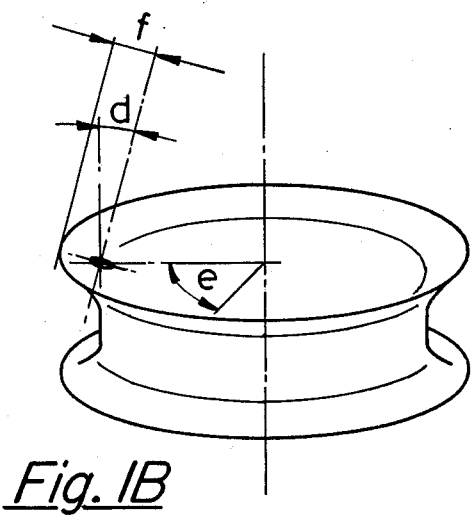
Fig. IB

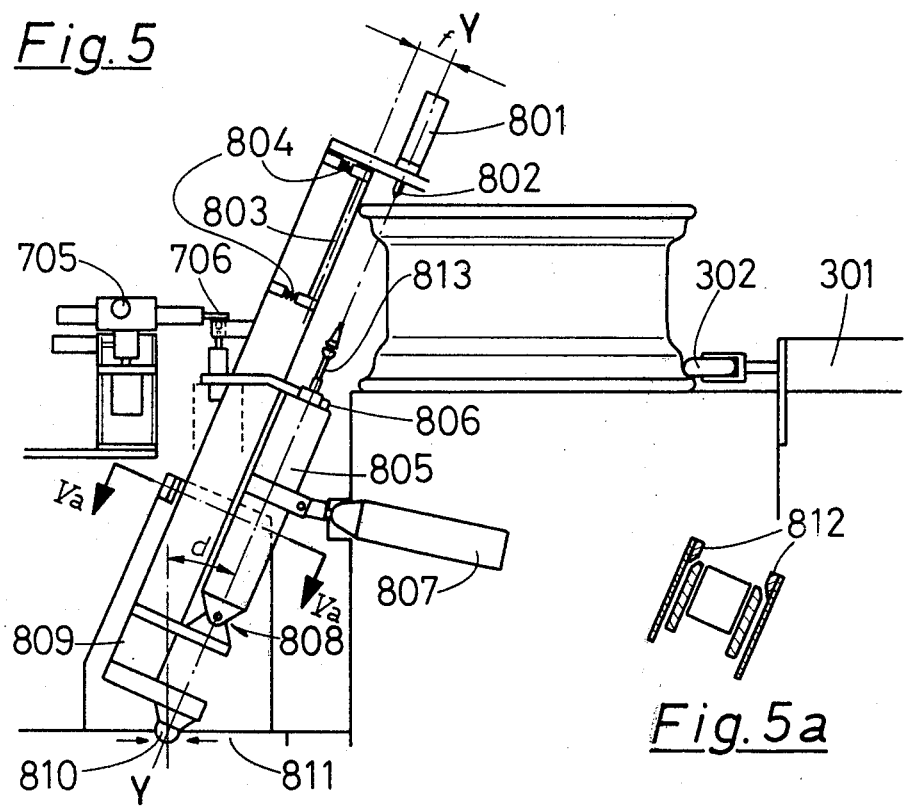
Fig. 5
Fig. 5a
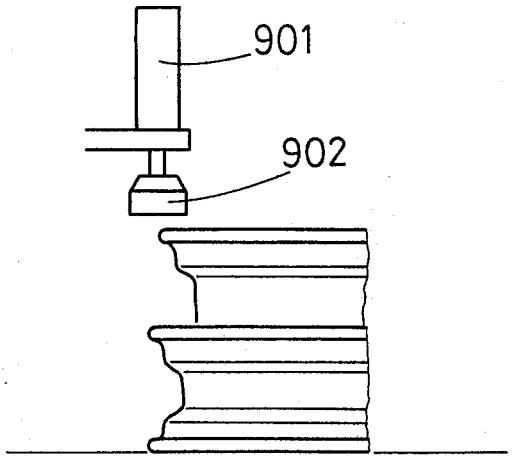
Fig. 6

MACHINE FOR POSITIONING VALVES ON RIMS FOR TUBELESS TIRES

BACKGROUND OF THE INVENTION

This invention is directed to a machine for fitting tire valves on wheel rims intended for receiving tubeless tires.

In order to reduce the cost of tire-fitting operations, various machines have been proposed in the past for positioning a tire valve on each wheel rim of a same size.

Since each car type is to be provided with wheels having technical characteristics consistent with the performances for which the car has been designed by the manufacturer, several series of rims having different diameters and thicknesses had to be provided within a range tending to become gradually narrower.

Now known machines of this character require a long, accurate and tedious re-adjustment when changing from one rim type to another.

SUMMARY OF THE INVENTION

It is the primary object of the present invention to provide a machine of the type broadly set forth hereinabove, which adapts itself automatically to the various parameters associated with a specific rim type, in order to dispense with the preliminary adjustments hitherto required when starting tire-fitting operations with another, different series of wheel rims, within a range of conventional sizes.

This result is obtained with the machine according to the instant invention which comprises pneumatic, electric and/or electronic control means capable of logically programming rim transfer means, means for separating the rims and positioning same successively, means for urging the thus positioned rim against means for rotatably driving said rim, means for rotatably driving each positioned rim, means for detecting the valve hole in relation to an axis ZZ of emitting and receiving elements of a detection cell, means for positioning the valve hole on an axis YY common to a centering point and to a valve-supporting cylinder adapted to introduce the valve into said valve hole, means for selecting a valve for each rim, means for introducing a valve into the valve hole of the rim, and means for holding the rim during the valve fitting operation.

The essential features characterising this machine lie in the fact that all the valve positioning steps are accomplished automatically, irrespective of the sizes of the rims utilized for equipping passengers or like lightweight vehicles.

Other features and advantages of the invention will appear as the following description proceeds with reference to the attached drawings illustrating diagrammatically by way of example a typical form of embodiment of the machine.

BRIEF DESCRIPTION OF THE DRAWINGS

FIGS. 1A and 1B illustrate a geometrical definition of the parameters involved;

FIG. 5 is a diagram showing the valve positioning means;

FIG. 5a is a cross-section showing a detail of part of FIG. 5, as seen in the direction of the arrows Va—Va, and FIG. 6 is a fragmentary side elevational view showing the rim hold-down means during the valve insertion.

DESCRIPTION OF THE PREFERRED EMBODIMENT

Referring first to FIG. 1A giving the geometrical definition of the main parameters to be taken into account for constructing a machine for fitting a tire valve to a wheel rim, which are:

the axial distance a from the centre of the valve hole to the rim axis, the axial distance b from the centre of the valve hole to the opposite rim edge, the angular position e of the valve hole, and the angle d from the normal to the valve bearing face, on the one hand, to the rim axis, on the other hand.

In hitherto known valve positioning machines, this angle d is disregarded since it was deemed that the variations from one rim type to another are of negligible value.

On the other hand, the radial and axial distances a and b respectively vary very considerably from one series of rims to another, according to rim sizes and manufacturers.

In certain cases, the parameter a is replaced by its complement c to the rim radius, and deemed wrongly as sufficiently regular to be taken as a constant value. In fact, two rims of a same type but made by different manufacturers are not characterized by the same radial complement c to said parameter a.

As far as the angular position e is concerned, it corresponds to a rim rotation during which a mechanical or photocell detector is operated for finding the valve hole.

From these concepts, it appears clearly that these known machines cannot be used for fitting tire valves to different rims unless each machine is adapted for each specific rim type, otherwise when the machine is operated it will frequently occur that the valve will not be positioned exactly in alignment with the hole, so that many offals will result.

In contrast thereto, the machine according to the present invention (FIG. 2), instead of taking into account the above-mentioned parameters, is based essentially on the position of the valve hole on the rim, this position being characterized by the following parameters with reference to FIG. 1B:

the angle d from the normal to the valve bearing face to the rim axis, the variations in this angle being considered as negligible for the various rims concerned;

the distance f from the centre of the valve hole to the rim edge, measured in the valve bearing plane; in fact, it is actually found that this distance is substantially more constant that the above-defined distance c;

the angular position e of the valve hole, as defined hereinabove.

Figure 3:
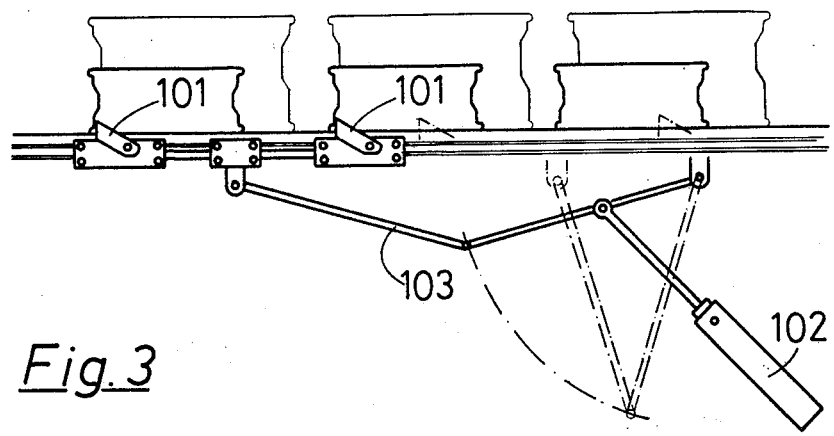
FIG. 3 is a diagram illustrating the rim transfer means.

The rims are fed along the conveyor system of the assembly line by means of catches 101 adapted to retract when driven in the negative direction, and sliding on guide rails under the control of a fluid-operated cylinder 102 and a knee-action linkage 103 (FIG. 3).

Figure 2:
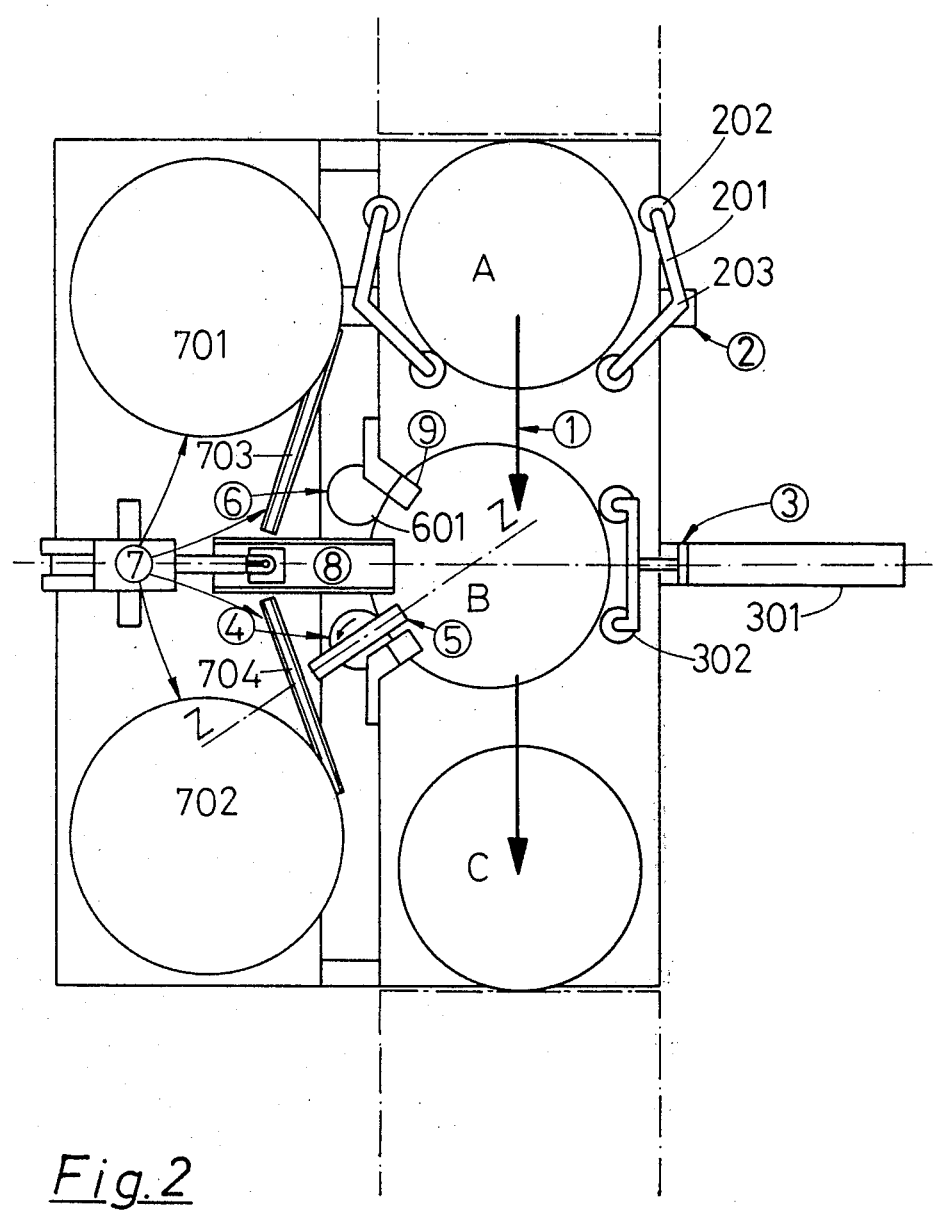
FIG. 2 is a diagrammatic top plan view of the machine.

The means for separating and positioning the rims 2 comprises separators 2 consisting of at least one two-armed lever, each arm 201 carrying at its free or outer end a roller 202. Rotating these separators about their fulcra 203 will release a rim retained between the rollers 202, so that the rim can be moved from position A to position B (FIG. 2).

Figure 4:
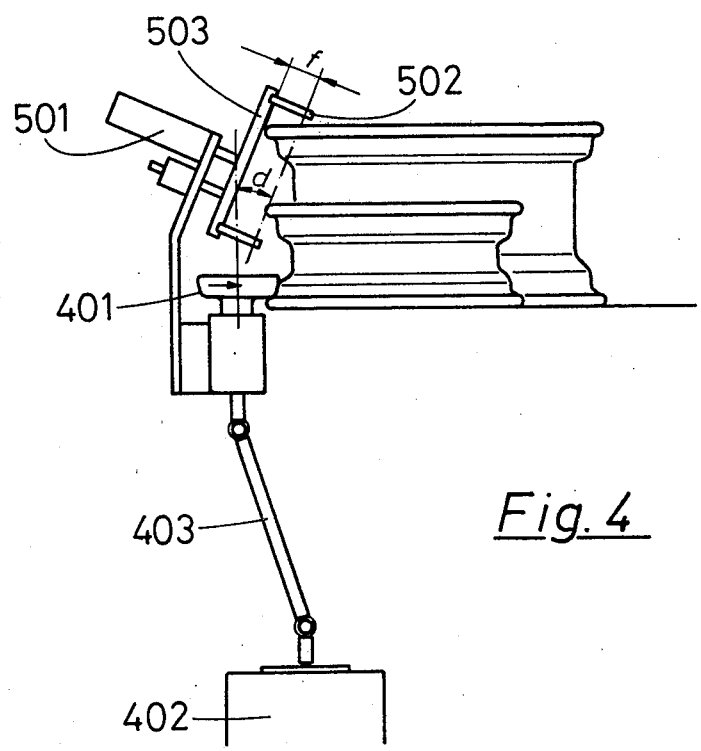
FIG. 4 is another diagram showing the means for rotating the rim and detecting the valve hole.

The pressure device 3 comprises a fluid-operated actuator or cylinder 301 the piston rod of which can drive with its free end a pair of rollers 302 so that when the actuator 301 is energized the rim will be moved to a position in which its centre is coincident with a plane containing an axis YY common on the one hand to a centering spindle or mandrel and on the other hand to another cylinder carrying and controlling a valve to be fitted, said pair of rollers 302 also urging the rim against a driving roller 401 (FIG. 4) for rotating the rim, as will be explained presently.

The device 4 for rotatably driving the rim comprises said roller 401 driven in turn from a motor 402 via an offset shaft 403 provided with universal joints. The roller 401 is rotated from motor 402 when the cylinder 301 and rollers 302 exert a pressure against the rim to facilitate the centering thereof.

The device 5 for detecting the valve hole position comprises a detection cell 502 (FIGS. 2 and 3) driven by a cylinder 501 and a bearing roller 503 engaging the rim edge. The function of this device is to detect the valve hole when it is coincident with the optical beam shown diagrammatically by the axis ZZ set to an angle d, the passage of this beam controlling the positioning device 6.

The device 6 for positioning the valve hole on axis YY comprises a roller 601 driven at a relatively slow rotational speed when the valve hole has been detected and until this hole is properly aligned with the axis YY.

The device 7 for selecting a valve for each rim comprises at least one vibrating bowl 701,702 filled with tire valves, at least one chute or channel 703,704 being provided for conveying the valves from the bowl to a selector 705 adapted to deliver the valves separately to a pick-up clamp 706 by which the valve is slipped onto an axial rod 813 of a valve fitting cylinder 805.

The device 8 for accurately positioning and introducing a valve into the valve hole comprises (FIGS. 2 and 5):

a re-centering cylinder 801,
a re-centering spindle 802,
a roller 803 in rotary driving contact with the rim edge,
compensation spring means 804 for equalizing the pressure exerted by the bearing roller 803,
a valve insertion cylinder 805,
a fitting 806 for positioning the valve insertion cylinder 805,
a pivotal mounting 808 for cylinder 805,
a bracket 809 for supporting the complete device 8,
a ball-joint 810 for pivotally mounting said bracket 809,
means 811 for locking the ball-joint when the bracket 809 is in the desired position,
means 812 for re-centering the device 8 in relation to the valve supply position, and
a valve-supporting axial spindle 813.

The bearing device 9 comprises a cylinder 901 controlling the vertical position of a pad 902 adapted to hold the rim with a force sufficient to withstand the thrust exerted by the valve positioning device 8.

The above-described machine operates as follows:

A rim is fed to the waiting position A between separator arms 201. The device 7 is operated to select a valve, and the rim is moved from position A to position B by means of latches 101 the translation of which on the guide rail is obtained by actuating the cylinder 102 and linkage 103, the latter being designed to combine a faster rate of operation with a relatively short stroke of control cylinder 102.

Then, the actuation of cylinder 301 causes the rollers 302 to engage the rim and urge same against the spaced rollers 401 and 601. From the very beginning of the thrust exerted by cylinder 301 the motor 402 is energized to rotate roller 401, in order to facilitate the proper entering of the rim. Simultaneously, the valve hole detector 5 is actuated as a consequence of the driving engagement between the rim edge and roller 503. During the hole finding step, the rim is driven at a relatively fast rate by roller 401, and when the valve hole has been detected, the rim is rotated at a considerably lower speed.

At the same time, a tachometer, revolution counter or optical coder is operated so that the valve hole detected on axis ZZ will stop when it registers exactly with axis YY. In fact, the development of the rim sector involved varies by about 2 mm from the smallest rim to the largest rim of a passenger vehicle.

The rim rotation is stopped by means of a solenoid-operated brake (not shown) associated with the motor 402, and when stopped the rim is locked in position by means of the rubber pad 902 responsive to cylinder 901.

The valve insertion device 8 becomes operative when a valve hole is detected by cell 502. The bracket 809 supporting this device 8 responsive to cylinder 807 moves from a position in which it extends at right angles to the plane of symmetry of the rim to a position forming an angle d with this plane, so as to bear against the fitting 806 and be aligned with the re-centering spindle 802. This spindle 802 actuated by another cylinder 801 is introduced into the valve hole, so that the axial insertion spindle 813 and centering spindle 802 are brought into mutual alignment with a common axis coincident with the centre of the valve hole, this axis forming an angle d with the plane of symmetry of the rim.

Having thus centered the valve hole of the rim, the locking means 811 associated with ball-joint 810 hold the bracket 809 against movement, so that the centering rod 802 can be retracted from the valve hole.

The valve insertion cylinder 805, duly provided with a valve sprayed with soapy water, is then actuated to insert the valve into the rim valve hole.

When the operation is completed, means (not shown) may be used for checking the proper positioning of the valve in the rim, and the bearing rollers 302 are retracted to free the rim.

Finally, the rim with the valve inserted therein is conveyed from the operative position B to the discharge position C, and at the same time another, valveless rim is moved from position A to position B. During the rim transfer, the bracket 809 recedes and resumes its position within the centering means 812. Cylinder 805 on the other hand resumes its vertical position by pivoting about its pivot pin 808, and is ready for starting another cycle.

Due to the provision of two valve selection bowls 701, 702, it is possible to fit one of two different valve types, the selection being made externally of the machine.

After selecting the proper valve type, the cycle will start again when a new rim is fed to the separator (position A).

The valve selecting device 7 operates as follows:

The selector 705 moves the valve clamp 706 loaded with a suitably selected valve from its intermediate position to a position in which it overlies one of the feed chute or channels 703, 704 delivering the valves separately from one of the valve filled bowls 701, 702. The clamp 706 picks up the valve, resumes its intermediate position and releases the valve so as to allow same to slip onto the axial rod 813.

Of course, various modifications and changes may be brought to the specific form of embodiment of the invention shown and described herein, without inasmuch departing from the basic principles of the invention recited in the following claims.

What is claimed is:

1. A machine for positioning and fitting tire valves on series of wheel rims to be provided with tubeless tires, this machine being adapted to take into account the various parameters characterizing the specific rim type concerned, by means of pneumatic, electric and/or electronic control means for logically programming:

conveyor means for feeding a plurality of rims;
    means for detaching a single rim from the series and positioning same in a waiting position, an operative position and a discharge position, respectively and successively;
    means for exerting a pressure against the detached rim in order to push same in its plane from said operative position to a valve-fitting position for engagement with driving roller means;
    means for driving said roller means and consequently said detached rim in said valve-fitting position;
    means for detecting the position of the valve hole of said rim in relation to an axis ZZ common to emitting and receiving elements of a photocell;
    means for positioning the valve hole along an axis YY common to a centering spindle and to a insertion cylinder provided with a valve to be positioned;
    means for selecting a valve for each rim;
    means for positioning the selected valve and introducing same into the rim valve hole; and
    means for holding the rim during the valve insertion, wherein the rims are caused to travel laterally in a plane parallel to the plane of symmetry of the rims; said detection means and valve hole positioning means differing from each other, the detection means being controlled and possibly corrected by the positioning means; the detection axis ZZ and the axis YY of the cylinder for introducing the valve into the valve hole forming therebetween an acute angle of same value as the angle from the perpendicular to the valve bearing face to the rim axis, the means for positioning each valve being of the floating type, its angular position in relation to the plane of symmetry of each valve varying from the fixed vertex of said acute angle.

2. A machine according to claim 1, wherein said conveyor means comprise latch members adapted to retract when driven in the negative direction and responsive for translation on a guide rail to a cylinder with the interposition of knee-action linkage means.

3. A machine according to claim 2, wherein said means for detaching a single rim from the series comprises at least one separator consisting of a two-armed lever provided at the free end of each arm with a roller adapted to engage the outer periphery of the rim, said lever being pivoted about an intermediate fulcrum.

4. A machine according to claim 3, wherein said means for exerting a pressure against a detached rim comprises a cylinder of which the piston rod carries at its free end and is adapted to drive a pair of rollers in order to position the rim in such a manner that the centre thereof lies in a plane perpendicular to its plane of symmetry containing two axes, i.e. the cylinder axis and the axis YY common to said centering spindle and to a valve insertion cylinder, the function of said pressure means consisting in pressing the rim against a powered roller adapted to rotate in turn said rim.

5. A machine according to claim 4, wherein said driving means comprise a roller driven by a motor through a shaft provided with universal joints.

6. A machine according to claim 5, wherein said means for detecting the valve hole in said rim comprises a cylinder adapted to position along said axis ZZ a detection cell of which the emitter element is separated from the receiving element by a roller rotatably engaged by the outer edge of said rim.

7. A machine according to claim 6, wherein said positioning means comprises a roller rotatably driven from said rim and adapted to measure the angular movement accomplished by the rim.

8. A machine according to claim 7, wherein said means for selecting a valve for each rim comprises at least one bowl filled with valves, at least one guide channel for delivering the valves to a selector and a clamp for picking up each valve separately.

9. A machine according to claim 8, wherein said valve positioning means comprise a bracket pivoted by means of a ball-joint retained in the frame structure of the machine, said bracket supporting a cylinder provided with a valve re-centering spindle, another cylinder carrying a valve to be inserted into the corresponding hole of the rim, said cylinders being aligned to a common axis YY on said bracket.

10. A machine according to claim 9, wherein said bracket comprises a bearing roller rotatably mounted on a pair of compensation springs and so disposed on said bracket as to be engageable by the outer edge of said rim during the rim rotation and during the valve insertion step.

11. A machine according to claim 10, wherein said valve insertion cylinder bears against said bracket at a bearing point consisting of a pivot means.

12. A machine according to claim 11, wherein said bracket is also provided with a fitting for positioning the valve insertion cylinder and with means for re-centering the positioning device, which is capable of determining the position in which the axis of the valve insertion cylinder is coincident with said axis YY.

13. A machine according to claim 12, wherein a double-acting cylinder reacting against the frame structure is provided for moving the valve insertion cylinder by turns alternatively towards said valve clamp for enabling same to pick up a valve and towards said re-centering means through said bracket.

14. A machine according to claim 13, wherein locking means are provided for locking said bracket on said ball-joint when said bracket is inclined to an angle corresponding to the angle formed between the normal to the plane of symmetry of the rim and the axis of the valve when fitted to the rim, so that the valve supporting cylinder can fit the valve in position into the valve hole of said rim.

* * * * *